US012724704B2

(12) United States Patent
Luo

(10) Patent No.: US 12,724,704 B2
(45) Date of Patent: Sep. 1, 2026

(54) PHYSICAL ADDRESS DETERMINATION IN MEMORIES

(71) Applicant: YANGTZE MEMORY TECHNOLOGIES CO., LTD., Wuhan (CN)

(72) Inventor: Xianwu Luo, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/744,065

(22) Filed: Jun. 14, 2024

(65) Prior Publication Data

US 2025/0307135 A1 Oct. 2, 2025

(30) Foreign Application Priority Data

Apr. 1, 2024 (CN) ........................ 202410390277.3

(51) Int. Cl.
*G06F 12/02* (2006.01)

(52) U.S. Cl.
CPC .. *G06F 12/0246* (2013.01); *G06F 2212/7201* (2013.01)

(58) Field of Classification Search
CPC .... G06F 3/0679; G06F 3/064; G06F 12/0246; G06F 2212/401; G06F 2212/7201
See application file for complete search history.

(56) References Cited

U.S. PATENT DOCUMENTS 8,959,155 B1 * 2/2015 Kwok ................. H04L 12/4633 709/205
10,762,281 B1 * 9/2020 Delio, Jr. .............. H03M 7/405
11,221,944 B1 * 1/2022 Wang ....................... G06F 3/064
2019/0213137 A1 * 7/2019 Lin ..................... G06F 12/0246
2021/0263682 A1 * 8/2021 Jeon ....................... G06F 3/0631
2021/0349655 A1 * 11/2021 Lin ........................ G06F 3/0604
2024/0345949 A1 * 10/2024 Liu ...................... G06F 12/0871
2024/0370365 A1 * 11/2024 Palmer ................ G06F 12/0292
2024/0385958 A1 * 11/2024 Palmer ................ G06F 12/0246

* cited by examiner

*Primary Examiner* — Tasnima Matin
(74) *Attorney, Agent, or Firm* — Conley Rose, P.C

(57) ABSTRACT

The present application discloses methods of operating a memory system, memory systems, hosts, and memory controllers. An example method includes receiving a read command, the read command including a first logical block address (LBA); based on a first attribute identifier corresponding to a first mapping table block in a compressed mapping table, determining a first physical address corresponding to the first LBA in the first mapping table block, the compressed mapping table including a plurality of attribute identifiers, the plurality of attribute identifiers corresponding to different mapping table blocks in a logical-to-physical (L2P) mapping table, an attribute identifier indicating whether physical addresses in a corresponding mapping table block are continuous, and the first mapping table block being the mapping table block in which the first LBA is located; and performing a read operation on a memory device based on the first physical address.

20 Claims, 12 Drawing Sheets

FIG. 5

PHYSICAL ADDRESS DETERMINATION IN MEMORIES

CROSS-REFERENCE TO RELATED APPLICATIONS

The present application claims the benefit of priority to Chinese Patent Application No. 2024103902773, which was filed Apr. 1, 2024, is titled "METHODS OF OPERATING MEMORY SYSTEM, MEMORY SYSTEMS, HOSTS AND MEMORY CONTROLLERS," and is hereby incorporated herein by reference in its entirety.

TECHNICAL FIELD

The present application relates to the technical field of memories, and in examples to methods of operating a memory system, memory systems, hosts, and memory controllers.

BACKGROUND

In a memory system, a memory controller is configured to control various operations of a memory device and is responsible for data scheduling between the memory device and a host. The memory controller maps a logical block address (LBA) of the host to a physical address in the memory device through a logical address to physical address (L2P) mapping table. However, the L2P mapping table occupies a memory space of the memory controller, and as the memory space occupied by the L2P mapping table increases to reach a certain range, the random read and write performance of the memory system is degraded.

SUMMARY

Examples of the present application provide methods of operating a memory system, memory systems, hosts, and memory controllers.

In a first aspect, a method of operating a memory system is provided, wherein the method comprises:

receiving a read command, the read command comprising a first logical block address (LBA);

based on a first attribute identifier corresponding to a first mapping table block in a compressed mapping table, determining a first physical address corresponding to the first LBA in the first mapping table block, the compressed mapping table comprising a plurality of attribute identifiers, the plurality of attribute identifiers corresponding to different mapping table blocks in a logical-to-physical (L2P) mapping table, an attribute identifier indicating whether physical addresses in a corresponding mapping table block are continuous, and the first mapping table block being the mapping table block in which the first LBA is located; and performing a read operation on a memory device based on the first physical address.

In an example, the attribute identifier occupies 1 bit.

In an example, based on a first attribute identifier corresponding to a first mapping table block in the compressed mapping table, determining a first physical address corresponding to the first LBA in the first mapping table block comprises:

determining a start physical address in the first mapping table block in response to the first attribute identifier indicating that physical addresses in the corresponding mapping table block are continuous; and determining the first physical address based on the start physical address and the first LBA.

In an example, the determining a start physical address in the first mapping table block comprises:

acquiring the start physical address from a compressed address table, the compressed address table to store a start physical address in each mapping table block of the L2P mapping table.

In an example, based on a first attribute identifier corresponding to a first mapping table block in the compressed mapping table, determining a first physical address corresponding to the first LBA in the first mapping table block comprises:

acquiring the first physical address from the first mapping table block in response to the first attribute identifier indicating that the physical addresses in the corresponding mapping table block are discontinuous.

In an example, the method further comprises:

performing continuity detection on physical addresses in a second mapping table block to obtain a detection result, the detection result indicating whether the physical addresses in the second mapping table block are continuous, and the second mapping table block being any mapping table block in the L2P mapping table; and updating a second attribute identifier corresponding to the second mapping table block in the compressed mapping table based on the detection result.

In an example, the performing continuity detection on physical addresses in the second mapping table block to obtain the detection result comprises:

detecting whether a plurality of write operations corresponding to a plurality of target logical addresses are performed continuously, the plurality of target logical addresses corresponding to the second mapping table block;

obtaining a first detection result in response to the plurality of write operations being performed continuously, the first detection result indicating that the physical addresses in the second mapping table block are continuous; and obtaining a second detection result in response to the plurality of write operations being not performed continuously, the second detection result indicating that the physical addresses in the second mapping table block are discontinuous.

In an example, the performing continuity detection on physical addresses in the second mapping table block to obtain the detection result comprises:

acquiring a plurality of physical addresses in the second mapping table block from the L2P mapping table;

obtaining a first detection result in response to the plurality of physical addresses being continuous, the first detection result indicating that the physical addresses in the first mapping table block are continuous; and obtaining a second detection result in response to the plurality of physical addresses being discontinuous, the second detection result indicating that the physical addresses in the first mapping table block are discontinuous.

In a second aspect, a method of operating a memory system is provided, wherein the method comprises:

performing continuity detection on physical addresses in a second mapping table block in a logical-to-physical (L2P) mapping table to obtain a detection result, the detection result indicating whether the physical addresses in the second mapping table block are continuous; and updating a second attribute identifier corresponding to the second mapping table block in a compressed mapping table based on the detection result, the compressed mapping table comprising a plurality of attribute identifiers, the plurality of attribute identifiers corresponding to different mapping table blocks in the L2P mapping table, and an attribute identifier indicating whether physical addresses in a corresponding mapping table block are continuous.

In an example, the attribute identifier occupies 1 bit.

In an example, the performing continuity detection on the physical addresses in the second mapping table block in the logical-to-physical (L2P) mapping table to obtain the detection result comprises:

detecting whether a plurality of write operations corresponding to a plurality of target logical addresses are performed continuously, the plurality of target logical addresses corresponding to the second mapping table block;

obtaining a first detection result in response to the plurality of write operations being performed continuously, the first detection result indicating that the physical addresses in the second mapping table block are continuous; and obtaining a second detection result in response to the plurality of write operations being not performed continuously, the second detection result indicating that the physical addresses in the second mapping table block are discontinuous.

In an example, the performing continuity detection on the physical addresses in the second mapping table block in the logical-to-physical (L2P) mapping table to obtain the detection result comprises:

acquiring a plurality of physical addresses in the second mapping table block from the L2P mapping table;

obtaining a first detection result in response to the plurality of physical addresses being continuous, the first detection result indicating that the physical addresses in the first mapping table block are continuous; and obtaining a second detection result in response to the plurality of physical addresses being discontinuous, the second detection result indicating that the physical addresses in the first mapping table block are discontinuous.

In an example, the method further comprises:

receiving a read command, the read command comprising a first logical block address (LBA);

based on a first attribute identifier corresponding to a first mapping table block in the compressed mapping table, determining a first physical address corresponding to the first LBA in the first mapping table block, the first mapping table block being the mapping table block to which the first LBA belongs; and performing a read operation on a memory device based on the first physical address.

In an example, based on the first attribute identifier corresponding to the first mapping table block in the compressed mapping table, determining the first physical address corresponding to the first LBA in the first mapping table block comprises:

determining a start physical address in the first mapping table block in response to the first attribute identifier indicating that physical addresses in the corresponding mapping table block are continuous; and determining the first physical address based on the start physical address and the first LBA.

In an example, the determining a start physical address in the first mapping table block comprises:

acquiring the start physical address from a compressed address table, the compressed address table to store a start physical address in each mapping table block of the L2P mapping table.

In an example, based on the first attribute identifier corresponding to the first mapping table block in the compressed mapping table, determining the first physical address corresponding to the first LBA in the first mapping table block comprises:

in response to the first attribute identifier indicating that the physical addresses in the corresponding mapping table block are discontinuous, acquiring the first physical address from the first mapping table block stored in the memory device.

In a third aspect, a memory controller is provided. In an example, the memory system comprises a memory controller and a memory device, wherein the memory controller is configured to receive a read command, the read command comprising a first logical block address (LBA); based on a first attribute identifier corresponding to a first mapping table block in a compressed mapping table, determine a first physical address corresponding to the first LBA in the first mapping table block, the compressed mapping table comprising a plurality of attribute identifiers, the plurality of attribute identifiers corresponding to different mapping table blocks in a logical-to-physical (L2P) mapping table, an attribute identifier indicating whether physical addresses in a corresponding mapping table block are continuous, and the first mapping table block being the mapping table block in which the first LBA is located; and perform a read operation on the memory device based on the first physical address; and the memory device is configured to return data stored at the first physical address to the memory controller in response to the read operation.

In an example, the memory controller is further configured to perform any one of example implementations in the first aspect, or perform the second aspect or any one of example implementations in the second aspect.

In a fourth aspect, a host is provided, comprising a memory controller configured to control a memory device, wherein the memory controller is configured to perform the method in the first aspect, any one of example implementations in the first aspect, the second aspect, or any one of example implementations in the second aspect.

In a fifth aspect, a memory controller is provided, comprising a memory interface and a processor, wherein the memory interface is configured to be connected with a memory device, and the processor is configured to execute program codes to cause the memory controller to perform the method in the first aspect, any one of example implementations in the first aspect, the second aspect, or any one of example implementations in the second aspect.

In a sixth aspect, a computer-readable storage medium is provided, wherein the storage medium stores at least one program code therein, the at least one program code being read by a processor in a memory controller to cause the memory controller to perform the method in the first aspect, any one of example implementations in the first aspect, the second aspect, or any one of example implementations in the second aspect.

BRIEF DESCRIPTION OF THE DRAWINGS

FIG. 5 illustrates a schematic diagram of division of mapping table blocks according to some examples;

DETAILED DESCRIPTION

In order to make objectives, technical solutions, and advantages of the present application clearer, the implementations of the present application will be described in detail below with reference to the drawings.

In the present application, the terms "first", "second", etc. are used for differentiation between identical or similar items having substantially the same role and function. It is to be understood that "first", "second", and "n-th" do not have logical or temporal dependency on each other, nor do they limit a number or an execution order. It is also be understood that although the terms first, second, etc. are used in the following description to describe various elements, these elements are not limited by these terms.

These terms are used only to distinguish one element from another element. For example, without departing from the scope of various examples, a first element may be referred to as a second element, and similarly, a second element may be referred to as a first element. Both the first element and the second element may be elements, and may be separate and different elements in some cases.

At least one means one or more, for example, at least one element may be any integer number of elements, with the integer being greater than or equal to one, such as one element, two elements, three elements, etc. At least two means two or more, for example, at least two elements may be any integer number of elements, with the integer being greater than or equal to two, such as two element, three elements, etc.

Figure 1:
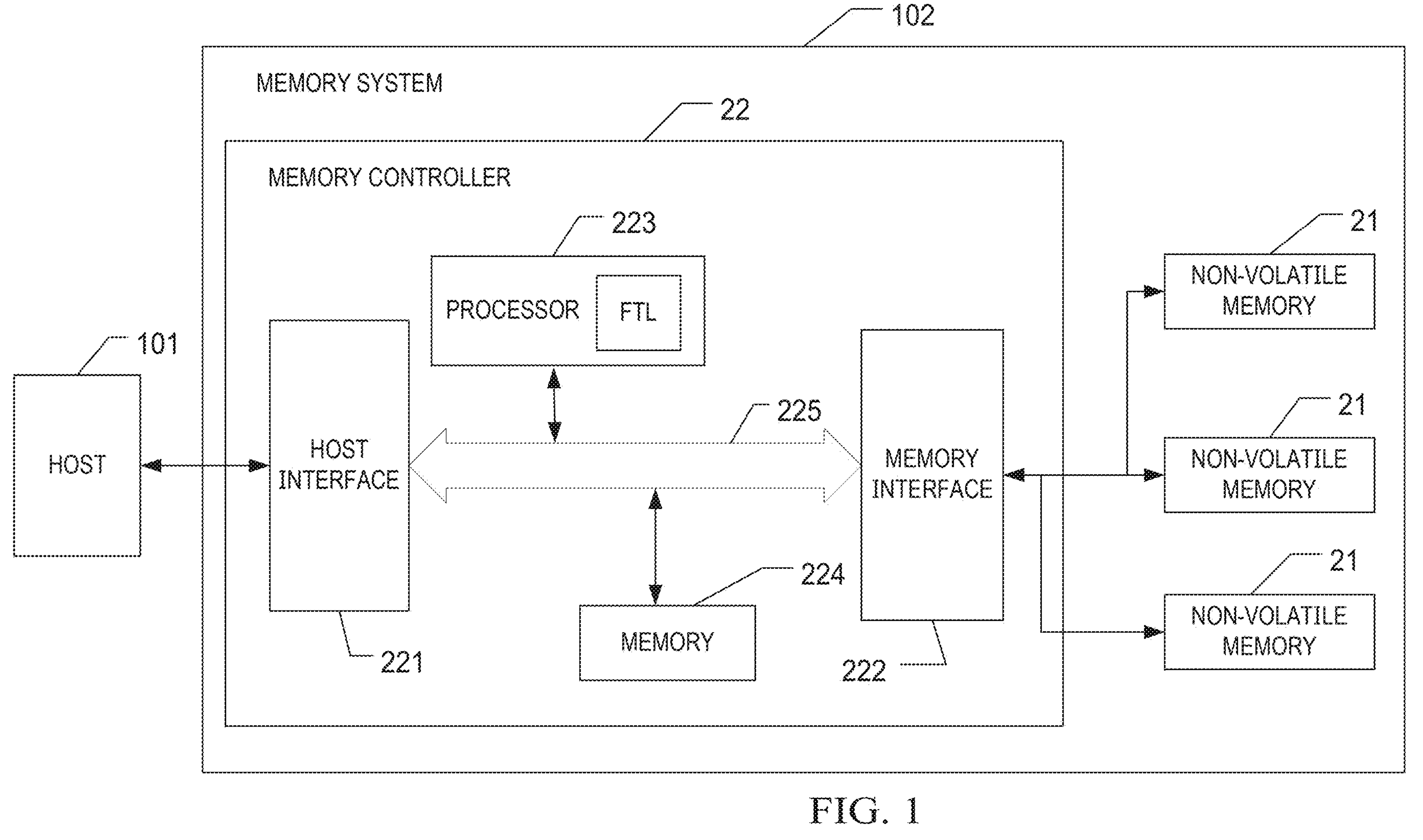
FIG. 1 illustrates an application environment of a memory system according to an some examples.

FIG. 1 illustrates a schematic diagram of an application environment of a memory system according to some examples. As shown in FIG. 1, the application environment comprises a host 101 and a memory system 102, wherein the host 101 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memories therein. According to an interface protocol for connection between the memory system 102 and the host 101, the memory system 102 may be configured as a memory device of the type of, for example, a Universal Flash Storage (UFS) device, a Solid-State Drive (SSD), a Multi-Media Card (MMC) (e.g., embedded Multi-Media Card (eMMC), reduced-size Multi-Media Card (RS-MMC), and a micro MMC, etc.), a Secure Digital (SD) (e.g., mini-SD and micro-SD) card, a Personal Computer Memory Card International Association (PCMCIA) card, etc., a memory device of the type of a Peripheral Component Interconnection (PCI), a memory device of the type of a PCI-Express (PCI-E), a Compact Flash (CF) card, a smart media card, or a memory stick, etc.

The host 101 controls overall operations of the memory system 102. For example, the host 101 may comprise a host processor and a host memory, and the host processor may control operations of the host 101. For example, the host processor may interact with the memory system 102 via, for example, a memory driver to control various operations of the memory system 102. The memory driver is configured to, for example, control a software module of the memory system 102. The host 101 may control, via the memory driver, the memory system 102 to perform, for example, data program, read, and erase operations. The memory driver may also load a mapping table into a host memory to increase a speed of a read operation performed by the memory system 102 under control of the host processor.

The memory system 102 may store data to be accessed by the host 101. The host 101 may be configured to send data to the memory system 102. Alternatively, the host 101 may be configured to receive the data from the memory system 102.

As shown in FIG. 1, the memory system 102 comprises a memory device 21 and a memory controller 22, wherein there is at least one memory device 21, the memory device 21 is a storage medium in the memory system 102 that is configured to store data, and the memory device 21 may be a non-volatile memory, such as a NAND flash memory device, a three-dimensional (3D) NAND flash memory device, etc.

The memory controller 22 is coupled to the host 101 and communicates with the host 101. FIG. 1 shows as an example in which the host 101 does not comprise the memory controller 22. In some other examples, the memory controller 22 may also be provided in the host 101, e.g., the host 101 comprises the memory controller 22, and the examples of the present application here do not limit whether the memory controller 22 is provided in the host.

The memory controller 22 is also coupled to the memory device 21, manages data stored in the memory device 21, and is responsible for data scheduling between the memory device 21 and the host 101. The memory controller 22 may be configured to control operations of the memory device 21, such as read, erase, and program operations. The memory controller 22 may further be configured to manage various functions with respect to data stored or to be stored in the memory device 21, including, but not limited to, bad-block management, garbage collection, logical-to-physical address translation, wear leveling, etc. The memory controller 22 may further perform any other suitable functions, e.g., formatting the memory device 21.

In an example, as shown in FIG. 1, the memory controller 22 comprises a host interface 221, a memory interface 222, a processor 223, a memory 224, and a bus 225, and various components (e.g., 221-224) in the memory controller 22, except the bus 225, are connected to the bus 225 and communicate with each other via the bus 225. The memory controller 22 may control the memory system 102 to perform operations by driving firmware or software stored in the memory device 21. The memory controller 22 may decode and drive, for example, an instruction or algorithm of a code type of the firmware or software. Furthermore, the memory controller 22 may be implemented as hardware or a combination of hardware and software.

The host interface 221 may be connected with the host 101 and communicate with the host 101 according to an interface protocol, wherein the interface protocol may be any one of an MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer System Interface (SCSI) protocol, an Enhanced Small Disk Interface (ESDI) protocol, an Integrated Drive Electronics (IDE) protocol, and a Firewire protocol.

The memory interface 222 may be connected with the memory device 21 according to a respective interface protocol. In an example, the memory interface 222 communicatively interacts with the memory device 21 via an open NAND flash interface (ONFI) protocol. The memory interface 222 may control the memory device 21 according to the processor 223. The memory interface 222 may provide a control signal to the memory device 21, and the control signal may include command, address, and operation control signals, etc. for controlling the memory device 21.

The processor 223 may drive the firmware or software stored in the memory device 21 or the memory 224 to control the memory system 102 to perform operations, wherein the firmware includes a flash translation layer (FTL), and the processor 223 may drive the FTL to control an inherent operation of the memory device 21 and provide device compatibility to the host 101. When driving the FTL, the host 101 may regard and use the memory system 102 as a general memory device such as a hard disk. Furthermore, the processor 223 may also implement functions such as wear leveling, garbage collection, and bad-block management by, for example, driving the firmware. The processor 223 may be any suitable integrated circuit configured to receive instructions from the host 101 and to perform read, program, and erase operations of the memory device by transmitting commands and/or data to the memory device 21 via the memory interface 222. For example, the processor 223 receives a request for memory device 21 (e.g., a read or write operation) from one or more hosts 101 via the host interface. The processor 223 may also be configured to communicate with and control other components of the memory controller 22.

The processor 223 may also be configured to execute program codes to cause the memory controller 22 to implement a method of operating a memory system described below, wherein the program code may be stored in the memory 224 of the memory controller 22 or in the firmware of the memory controller 22 in the memory device 21. In an example, the present application further provides a computer-readable storage medium storing at least one program code, wherein the processor 223 reads and executes the at least one program code to cause the memory controller 22 to implement the method of operating the memory system described below. The computer-readable storage medium may be the memory device 21 or a storage medium in the memory device 21.

In some examples, the processor 223 may perform one or more command operations, internal operations, etc. by driving the FTL. For example, the processor 223 may control the memory device 21 by driving the FTL in response to a request from the host 101. At the same time, the processor 223 may perform the internal operations (e.g., a garbage collection operation, a read recovery operation, and a wear leveling operation) unrelated to the request from the host 101 by driving the FTL.

An operation of the FTL comprises completing a translation of a logical address space (e.g., an LBA) of the host 101 to a physical address space (e.g., a physical cluster address (PCA)) of the memory device 21. The memory system 102 writes a piece of user data into the memory device 21. The memory controller 22 calculates an LBA involved in a write request (e.g., a write command) sent by the host 101, acquires a corresponding logical cluster address (LCA), then allocates a physical address space such as a PCA for the piece of user data, stores the piece of user data in the corresponding PCA, and records an LCA-to-PCA mapping corresponding to the piece of user data, e.g., a logical cluster address to physical cluster address mapping relationship. When the host 101 reads the piece of user data, the memory system 102 reads the piece of data from the memory device 21 based on the mapping relationship and then returns it to the host 101.

Figure 2:
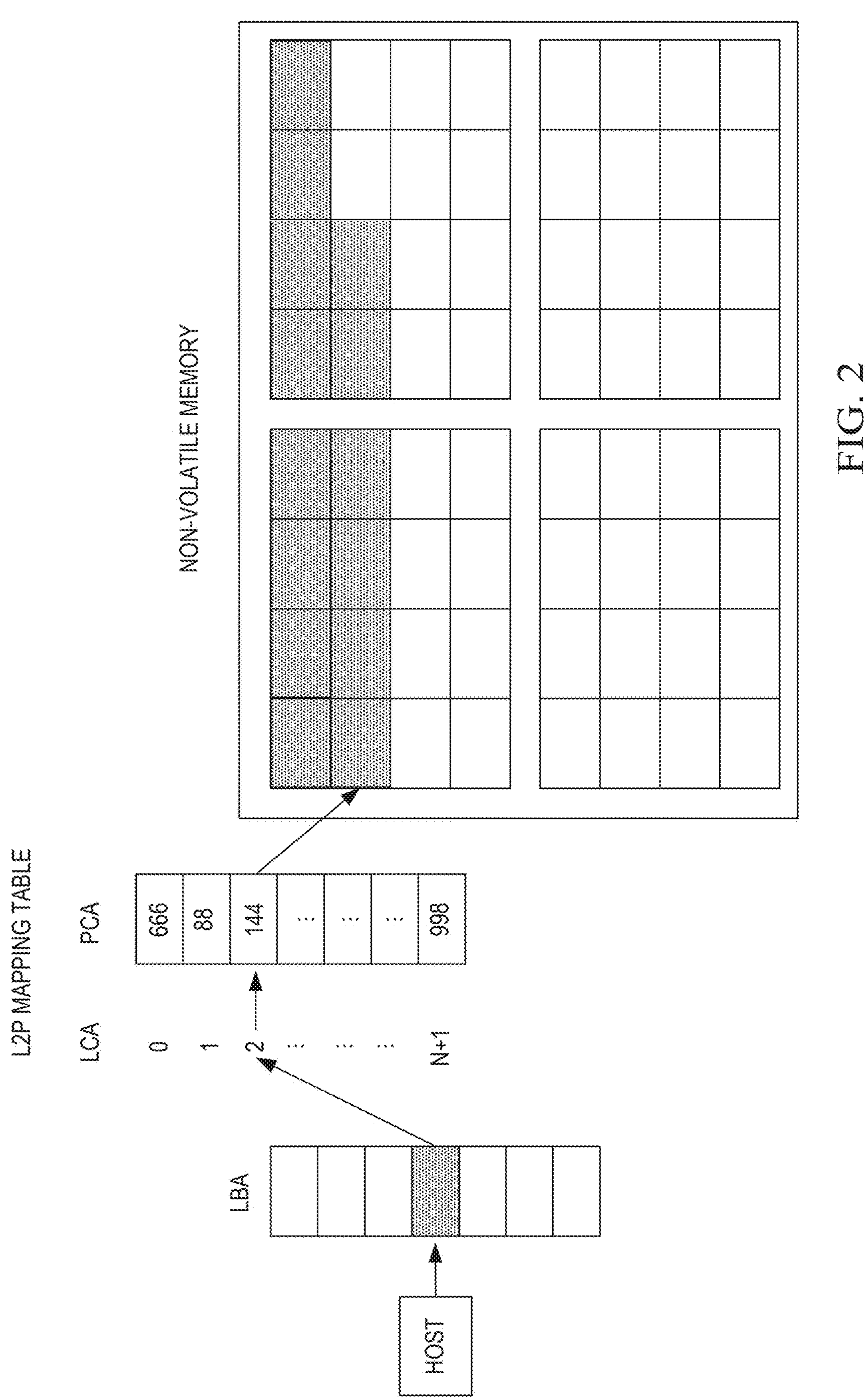
FIG. 2 illustrates a schematic diagram of a single level L2P mapping table according to some examples.

When managing a physical memory space of the memory device 21, the memory controller 22 may divide the entire physical memory space of the memory device 21 evenly into a plurality of corresponding logical memory spaces to perform cover expression, the plurality of logical memory spaces may cover the entire physical memory space of the memory device 21, and each logical memory space comprises a plurality of LCAs. In some examples, each logical memory space may correspond to a 4 K physical memory space. The memory system 102 may maintain a logical cluster address to physical cluster address mapping table (e.g., L2P mapping table) internally, so as to translate a logical block address recognized by the host 101 to a physical cluster address in the memory device, wherein the L2P mapping table comprises all LCA-to-PCA mapping relationships. As shown in FIG. 2, a PCA in a non-volatile memory to which an LBA is mapped may be determined in conjunction with the L2P mapping table.

The memory device 21 is configured to store the user data provided by a file system, and the file system is able to recognize a logical address (e.g., LBA) of the user data. As the memory device 21 is a physical address (e.g., PCA), the memory controller 22 is required to implement a translation between the logical address and the physical address, e.g., managing the L2P mapping table. In order to reduce a read latency of the host 101, the L2P mapping table is preferentially placed in the memory 224 of the memory controller 22 or in a cache in communication with the memory controller 22. In an example, the memory 224 of the memory controller 22 or the cache in communication with the memory controller 22 may include a volatile memory device, for example, which may include, but is not limited to, a static random access memory (SRAM), a dynamic random access memory (DRAM), etc.

Several methods can be used to store and maintain the L2P mapping table. One of the methods is a single-level direct L2P mapping solution, which may contain mapping information used for data in the entire memory device (e.g., FIG. 2). Therefore, the single-level direct page mapping solution requires a large amount of memory space (1 GB of data corresponds to an L2P mapping table with an order of magnitude of 1-2 MB) to store the L2P mapping table, which is challenging for a high-capacity memory device.

Figure 3:
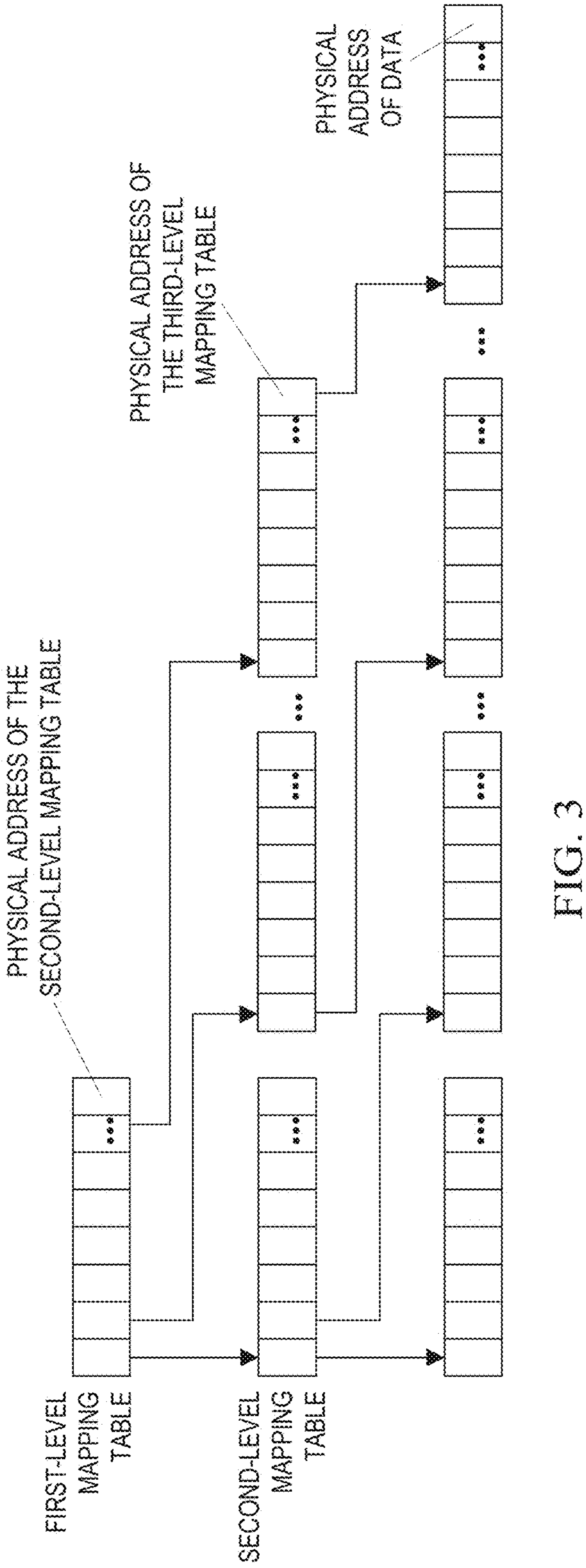
FIG. 3 illustrates a schematic diagram of a multi-level L2P mapping table according to some examples.
Figure 4:
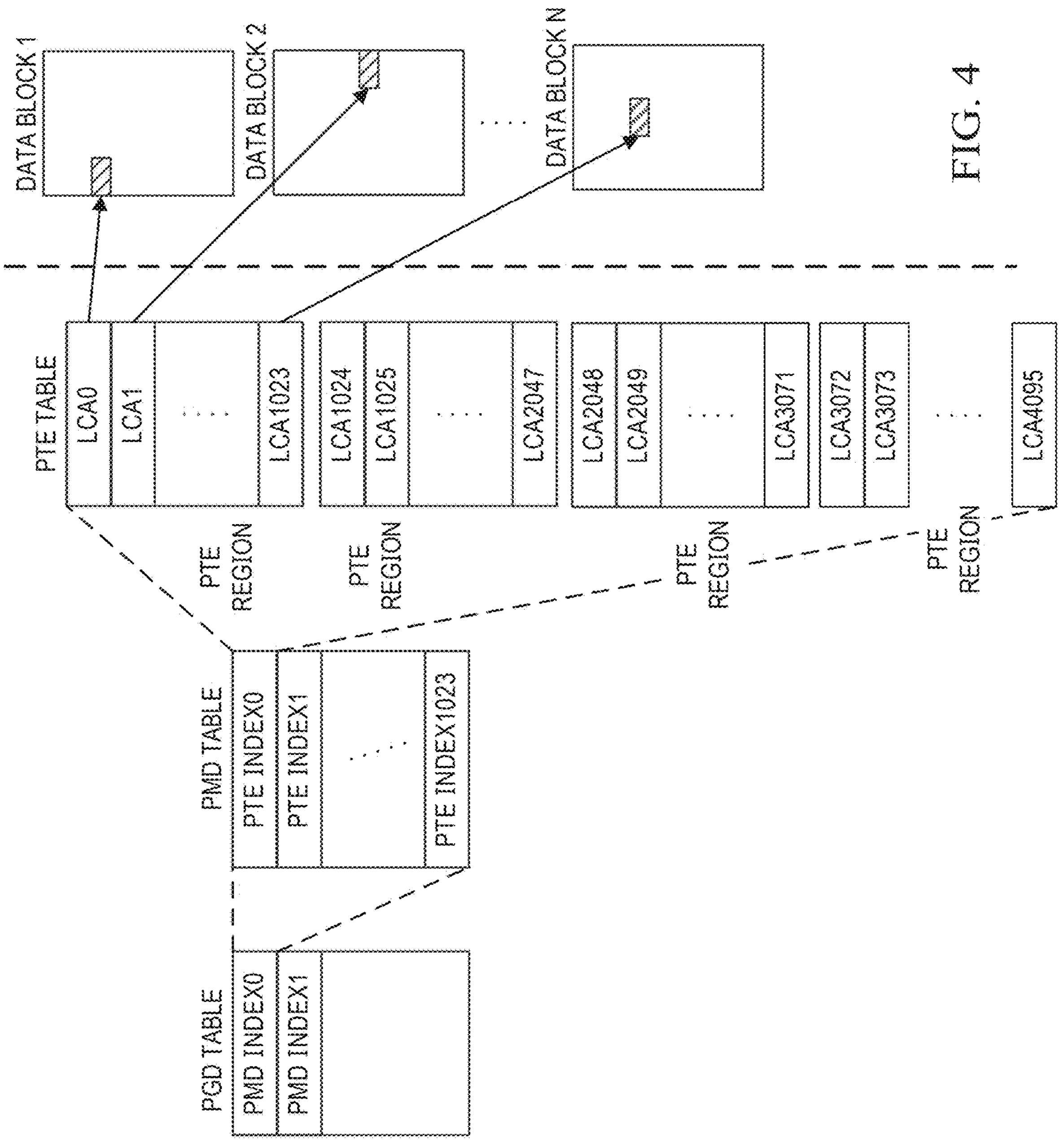
FIG. 4 illustrates a schematic diagram of another multi-level L2P mapping table according to some examples.

Another method to store and maintain the L2P mapping table is a multi-level mapping solution, which is illustrated here using a three-level mapping solution as an example. As shown in FIG. 3 and FIG. 4, a first-level mapping table may be referred to as a page global directory (PGD) or page directory, which stores a physical address (e.g., PCA) of a second-level mapping table, and each entry in the first-level mapping table points to the second-level mapping table, e.g., each entry in the first-level mapping table comprises an index number of the second-level mapping table and the physical address of the second-level mapping table, wherein the index number of the second-level mapping table is used to indicate the second-level mapping table. The second-level mapping table may be referred to as a page middle directory (PMD), which stores a physical address (e.g., PCA) of a third-level mapping table, and each mapping in the second-level mapping table points to a third-level mapping table, e.g., each entry in the second-level mapping table comprises an index number of the third-level mapping table and the physical address of the third-level mapping table, wherein the index number of the third-level mapping table is used to indicate the third-level mapping table. The third-level mapping table may be referred to as a page table entry (PTE), which stores a physical address (e.g., PCA) where the data is located.

The memory controller 22 may divide the entire physical memory space of the memory device 21 evenly into the plurality of corresponding logical memory spaces to perform the cover expression, and allocate a corresponding LCA to each logical memory space. The memory controller 22 may number a plurality of LCAs starting from 0 (e.g., LCA0) and sort the LCAs in the page table entry (PTE) starting from LCA0, with each LCA in the page table entry (PTE) having its fixed location. Referring to FIG. 4, each page table entry (PTE) comprises 4 page table entry (PTE) regions (PTE regions), each page table entry (PTE) region may comprise 1024 nodes, and each node may comprise one PCA for a mapping with an LCA and corresponds to a 4 K memory space. Thus, each page table entry (PTE) region may correspond to 4 M of user data, and each page table entry (PTE) may correspond to 16 M of user data.

In the multi-level mapping solution, the first-level mapping table may be stored in the memory 224 of the memory controller 22, that is, the first-level mapping table is resident in the memory 224, and some of the mapping tables of the other levels are stored in the memory device 21. When an L2P mapping relationship corresponding to a logical block address involved in a read command of the host 101 is not in the memory 224 of the memory controller 22, the memory controller 22 is required to first read the corresponding L2P mapping relationship from the memory device 21 to the memory 224, and then perform the respective read operation of the read command of the host 101.

As a storage capacity in the memory device 21 increases, a size of the L2P mapping table increases, and a large amount of memory space in the memory 224 is required for storing of the L2P mapping table and access operations on buffered data, thereby degrading the random read and write performance of the memory system 102.

Figure 5:
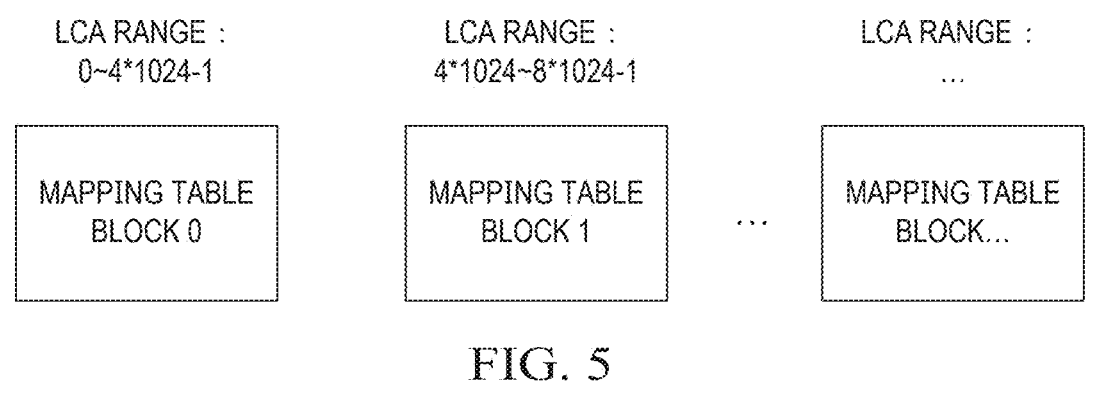

In view of this, as shown in FIG. 5, the memory controller 22 divides the L2P mapping table into a plurality of mapping table blocks, wherein the L2P mapping table may be either a single-level L2P mapping table or a last-level mapping table in a multi-level L2P mapping table (e.g., the third-level mapping table in FIG. 3 and FIG. 4). Each mapping table block corresponds to a logical memory space and a logical address in the logical memory space, wherein the logical address may be an LCA. As shown in FIG. 5, taking the physical space corresponding to the L2P mapping table having a size of 128 GB as an example, assuming that a size of each logical memory space is 6 MB, the 128 GB physical space is divided evenly into 8*1024 corresponding logical memory spaces to perform the coverage expression. Each logical memory space comprises 4*1024 continuous logical addresses, and table entries in the L2P mapping table where logical addresses in the logical memory space are located form one logical mapping table block, so that the logical mapping table block corresponds to the logical addresses in the corresponding logical memory space. For example, taking the logical address space being an LCA range as an example, referring to FIG. 4, each PTE table comprises 4 PTE regions, each PTE region comprises 1024 nodes, each node corresponds to one LCA, and all LCAs corresponding to each PTE table form an LCA range. Each PTE table may be regarded as a mapping table block that corresponds to an LCA range corresponding to the PTE table, for example, a PTE table corresponding to PTE index0 in the PMD table in FIG. 4 is regarded as a mapping table block 0 illustrated in FIG. 5, such that the mapping table block 0 corresponds to an LCA range LCA0 to LCA4*1024-1. A plurality of mapping table blocks in the L2P mapping table are numbered starting from 0 in an ascending order of corresponding logical addresses according to a principle that a start logical address of a mapping table block is aligned with a size of the mapping table block. For example, LCA0 to LCA4*1024-1 correspond to mapping table block 0, LCA4*1024-LCA8*1024-1 correspond to a mapping table block 1, and so on, wherein the start logical address of the mapping table block refers to a first logical address corresponding to the mapping table block, e.g., a start logical address of the mapping table block 0 is LCA0, and the size of the mapping table block is the number of physical addresses in the mapping table block (e.g., 4*1024). FIG. 5 provides an illustration with an example in which one PTE table serves as a mapping table block. In some other examples, one PTE table may be divided into a plurality of mapping table blocks, for example, when one PTE table comprises a plurality of PTE regions, at least one PTE region in the PTE table is determined to be a mapping table block, so that one PTE table may comprise a plurality of mapping table blocks.

Each mapping table block comprises various logical addresses in the corresponding logical memory space and physical addresses corresponding to the various logical addresses, e.g., taking FIG. 5 as an example, each mapping table block comprises 4*1024 LCAs and a physical address corresponding to each LCA in all the 4*1024 LCAs. Alternatively, each mapping table block corresponds to an identifier (e.g., a numbering) of each logical memory space, and each mapping table block does not comprise the logical addresses in the corresponding logical memory space, but only comprise the physical addresses corresponding to various logical addresses in the corresponding logical memory space. The physical address corresponding to each logical address in the mapping table block may be a PCA.

The plurality of physical addresses in the mapping table block may be continuous or discontinuous. Since the memory controller sequentially allocate physical addresses to performed write operations in an order of performing the write operations, whether the physical addresses in the mapping table block are continuous depends on whether the memory controller 22 performs the write operations corresponding to the logical addresses corresponding to the mapping table block continuously. Still taking the mapping table block 0 in FIG. 5 as an example, assuming that write operations corresponding to LCA0 to LCA4*1024-1 are write operations 0 to 4*1024-1 respectively, and that the memory controller 22 first performs write operation 0, allocates physical address 0 to LCA0 corresponding to the write operation 0, and writes, to the physical address 0, data instructed to be written by the write operation 0; then performs write operation 1, allocates a next physical address (referred to as physical address 1) following the physical address 0 to LCA1 corresponding to the write operation 1, and writes, to the physical address 1, data instructed to be written by the write operation 1; and so on, until write operation 4*1024-1 is completed. As such, write operations 0 to 4*1024-1 are performed continuously, and as LCA0 to LCA4*1024-1 correspond to the physical addresses 0 to 4*1024-1 respectively, the physical addresses corresponding to LCA0 to LCA4*1024-1 are continuous. Further assuming that, after performing the write operation 0, the memory controller 22 does not perform the write operation 1 but performs write operation 2. When performing the write operation 2, the memory controller 22 allocates the next physical address (referred to as the physical address 1) following the physical address 0 to LCA2 corresponding to the write operation 2, and writes, to the physical address 1, data instructed to be written by the write operation 2. Then the memory controller 22 performs the write operation 1, allocates a next physical address (referred to as physical address 2) following the physical address 1 to the LCA1 corresponding to the write operation 1, and writes, to the physical address 2, data instructed to be written by the write operation 1. After that, the memory controller 22 performs write operations 3 to 4*1024-1. The write operation 2 is performed prior to the write operation 1, such that the write operations 0 to 4*1024-1 are performed discontinuously, and LCA0 to LCA4*1024-1 correspond to the physical address 0, physical address 2, physical address 1, and physical addresses 3 to 4*1024-1 respectively, causing the physical addresses corresponding to LCA0 to LCA4*1024-1 to be discontinuous.

Figure 6:
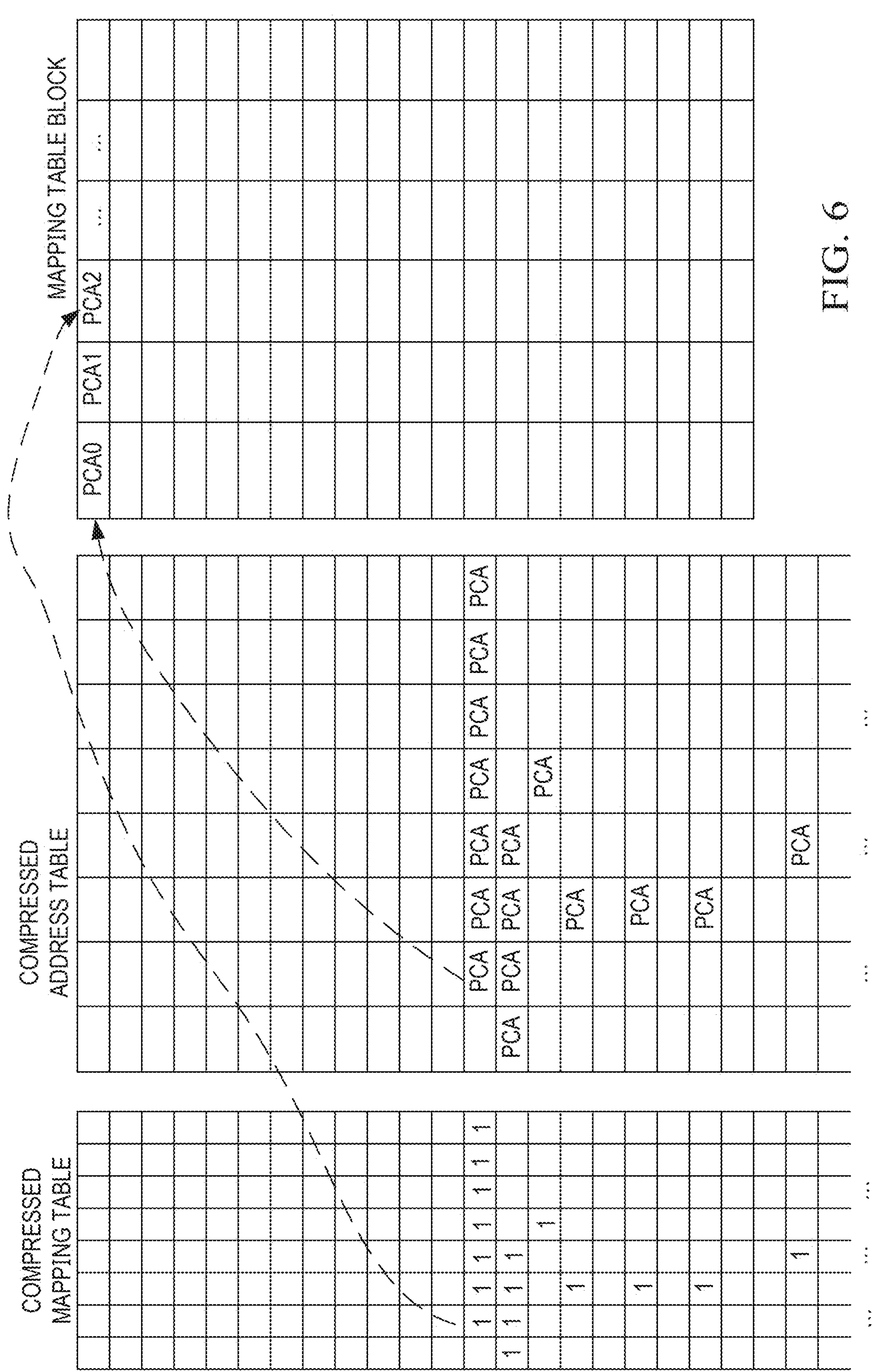
FIG. 6 illustrates a schematic diagram of a compressed mapping table and a compressed address table according to some examples.

In some examples, the L2P mapping table is compressed through a compressed mapping table (CMT) and a compressed address table, wherein the compression is performed as follows:

As shown in FIG. 6, the compressed mapping table comprises a plurality of bits that correspond to different mapping table blocks in the L2P mapping table, and each bit is used to store an attribute identifier of a corresponding mapping table block. That is, the compressed mapping table comprises the plurality of attribute identifiers, and the plurality of attribute identifiers correspond to different mapping table blocks in the L2P mapping table, thereby compressing each compress table block in the L2P mapping table respectively into a 1-bit attribute identifier. The attribute identifier is used to indicate whether physical addresses in the corresponding mapping table block are continuous, and the attribute identifier may be represented by 0 or 1. For example, an attribute identifier of 1 indicates that the physical addresses in the corresponding mapping table block are continuous, and an attribute identifier of 0 indicates that the physical addresses in the corresponding mapping table block are discontinuous.

The compressed address table comprises a plurality of address table entries, the plurality of address table entries correspond to different mapping table blocks in the L2P mapping table, and each address table entry is used to store a start physical address or a memory address of the corresponding mapping table block. For any table entry in the compressed address table, when physical addresses in a mapping table block corresponding to the table entry are continuous, the memory controller 22 stores a start physical address of the mapping table block at the table entry; when the physical addresses in the mapping table block corresponding to the table entry are discontinuous, the memory controller 22 stores a memory address of the mapping table block at the table entry. The start physical address of the mapping table block refers to a physical address corresponding to a start logical address of the mapping table block, such as PCA0 in the mapping table block shown in FIG. 6. The memory address of the mapping table block refers to a physical address in the memory device 21 where the mapping table block is stored.

In some examples, the compressed address table is divided into a first compressed address table and a second compressed address table, wherein the first compressed address table and the second compressed address table each both comprise a plurality of table entries, the plurality of table entries in the first compressed address table correspond to different mapping table blocks in the L2P mapping table, each table entry in the first compressed address table is used to store a start physical address of a corresponding mapping table block, and each table entry in the second compressed address table is used to store a memory address of a corresponding mapping table block. The first compressed address table and the second compressed address table may also be the same compressed address table or different compressed address tables, and in the case of the same compressed address table, each table entry is used to store the start physical address or memory address of the mapping table block.

Through the compressed mapping table and the compressed address table, the physical addresses in each mapping table block of the L2P mapping table can be compressed into a 1-bit attribute identifier and a physical address (the start physical address (a starting physical address or storage address of the mapping table block). The entire L2P mapping table is represented through the compressed mapping table and the compressed address table, thereby compressing the L2P mapping table. Still taking FIG. 5 as an example, assuming that the 128 GB physical space is divided evenly into 8*1024 corresponding logical memory spaces (e.g., LCA ranges) to perform cover expression, and that the L2P mapping table corresponding to the physical space is divided into 8*1024 mapping table blocks, a size of the required compressed mapping table is 8*1024 bits=1 KB. Assuming that each mapping table block comprise 4*1024 physical addresses, and that each physical address has a size of 4 bytes, a size of the required compressed address table is 8*1024*4 bytes=32 KB, wherein each table entry in the compressed address table occupies 4 bytes, thereby compressing the L2P mapping table into a 1 KB compressed mapping table and a 32 KB compressed address table.

In some examples, in the multi-level mapping solution, the compressed mapping table and the compressed address table can be integrated into the second-level mapping table (e.g., PMD table), so as to reduce the memory occupied by the L2P mapping table.

In some examples, the memory controller 22 may store the compressed mapping table and the compressed address table of the L2P mapping table in the memory 224, and the L2P mapping table is stored in the memory device 21, thereby reducing the memory space occupied by the L2P mapping table in the memory 224. The memory controller 22 may perform read and write operations on the memory device 21 through the compressed mapping table and the compressed address table in the memory 224, so as to improve the random read and write performance of the memory system 102.

Next, a process of maintaining and managing the compressed mapping table is described below through the method of operating a memory system shown in FIG. 7 below, wherein the memory system may be the memory system 102 described above, the memory system comprises a memory controller and a memory device, the memory controller may be the memory controller 22 described above, and the memory device may be the memory device 21 described above. The method is configured as being performed by the memory controller, and comprises the following operations.

At 701, the memory controller performs continuity detection on physical addresses in a second mapping table block in an L2P mapping table to obtain a detection result, the detection result indicating whether the physical addresses in the second mapping table block are continuous.

The L2P mapping table comprises a plurality of mapping table blocks, and physical addresses in the plurality of mapping table blocks are physical addresses (e.g., PCAs) of the memory device in the memory system. The introduction to the L2P mapping table and the mapping table blocks may be referred to above and are no longer repeated here. The second mapping table block is any mapping table block in the L2P mapping table. The detection result is a first detection result or a second detection result, wherein the first detection result is used to indicate that the physical addresses in the second mapping table block are continuous, and the second detection result is used to indicate that the physical addresses in the second mapping table block are discontinuous.

The attribute identifier corresponding to each mapping table block in the compressed mapping table is 0 initially, so as to indicate that the physical addresses in the corresponding mapping table block are discontinuous. Taking FIG. 8 as an example, the memory controller acquires a write command that comprises an LBA and to-be-written data, the write command instructing writing of the to-be-written data to a physical address corresponding to the LBA, and the to-be-written data being user data to be written to the LBA. The write command may be a write command sent by the host to the memory controller, and the to-be-written data is the user data provided by the host. Alternatively, the write command may also be a write command involved in a garbage collection (GC) process, and the to-be-written data is the user data (e.g., valid data) required to be saved in the garbage collection process, wherein the LBA is an LBA used to save the to-be-written data.

After acquiring the write command, the memory controller executes the write command, allocates the physical address (e.g., PCA) to the LBA in the write command, and performs a write operation on the memory device based on the allocated physical address, to write first data to the physical address. A mapping relationship between the LBA and the physical address is recorded in the L2P mapping table. Taking the mapping relationship being recorded in the L2P mapping table through an LCA as an example, a process of recording the mapping relationship is described as follows: the write command comprises a logical unit number (LUN) and an LBA, the LUN and the LBA can be combined to form the LCA corresponding to the LBA, a table entry in the L2P mapping table corresponding to the LCA is determined, and the physical address is stored in the table entry, so as to record the mapping relationship between the LBA and the physical address in the L2P mapping table.

A method of determining the table entry in the L2P mapping table corresponding to the LCA may be: if the L2P mapping table is a single-level mapping table, performing a query in the L2P mapping table for the table entry corresponding to the LCA, and taking FIG. 2 as an example, if the LCA is 2, determining a table entry in the L2P mapping table with an LCA of 2 to be the table entry corresponding to the PCA. If the L2P mapping table is a multi-level mapping table, taking the three-level L2P mapping table shown in FIG. 4 as an example, the LCA is divided by a total number of PMD tables in the three-level L2P mapping table, to obtain a target PMD index number (e.g., PMD index0). A query is performed in a PGD table for a physical address corresponding to the target PGD index number, and a PDM table (referred to as a target PDM table) is acquired from the physical address corresponding to the target PGD index number. The target PMD index number is divided by a total number of PTE tables in the three-level L2P mapping table, to obtain a target PTE index number (e.g., PTE index0). A query is performed in the target PDM table for a physical address corresponding to the target PTE index number, and a PTE table (referred to as a target PTE table) is acquired from the physical address corresponding to the target PTE index number. A query is performed in the target PTE table for the table entry corresponding to the LCA.

After this mapping relationship is established, the memory controller determines a mapping table block corresponding to the LBA in the write command, e.g., determining a mapping table block to which the LCA corresponding to the LBA belongs to be the mapping table block corresponding to the LBA. For case of description, the mapping table block corresponding to the LBA is referred to as the second mapping table block.

The memory controller performs a query in a compress address mapping table of the L2P mapping table for the attribute identifier (referred to as a second attribute identifier) corresponding to the second mapping table block, in response to the second attribute identifier indicating that the physical addresses in the second mapping table block are continuous, sets the second attribute identifier as indicating that the physical addresses in the second mapping table block are discontinuous, and in response to the second attribute identifier indicating that the physical addresses in the second mapping table block are discontinuous, does not perform the operation of setting the second attribute identifier as indicating that the physical addresses in the second mapping table block are discontinuous. Taking FIG. 8 as an example, a detection as to whether a bit (e.g., the second attribute identifier) corresponding to the second mapping table block in the compressed mapping table is greater than 0 is performed. In response to the bit being greater than 0, the second attribute identifier is 1, indicating that the physical addresses in the second mapping table block are continuous, and the bit in the compressed mapping table is set to zero, causing the second attribute identifier to become 0 to indicate that the physical addresses in the second mapping table block are discontinuous.

In the case where the second attribute identifier indicates that the physical addresses in the second mapping table block are discontinuous, the memory controller determines whether the LBA in the write command corresponds to a start logical address of the second mapping table block. For example, the LCA corresponding to the LBA is compared with the start logical address of the second mapping table block, if the LCA is the same as the start logical address, then the LBA corresponds to the start logical address of the second mapping table block, and if this LCA is different from the start logical address, then the LBA does not correspond to the start logical address of the second mapping table block.

Figure 8A:
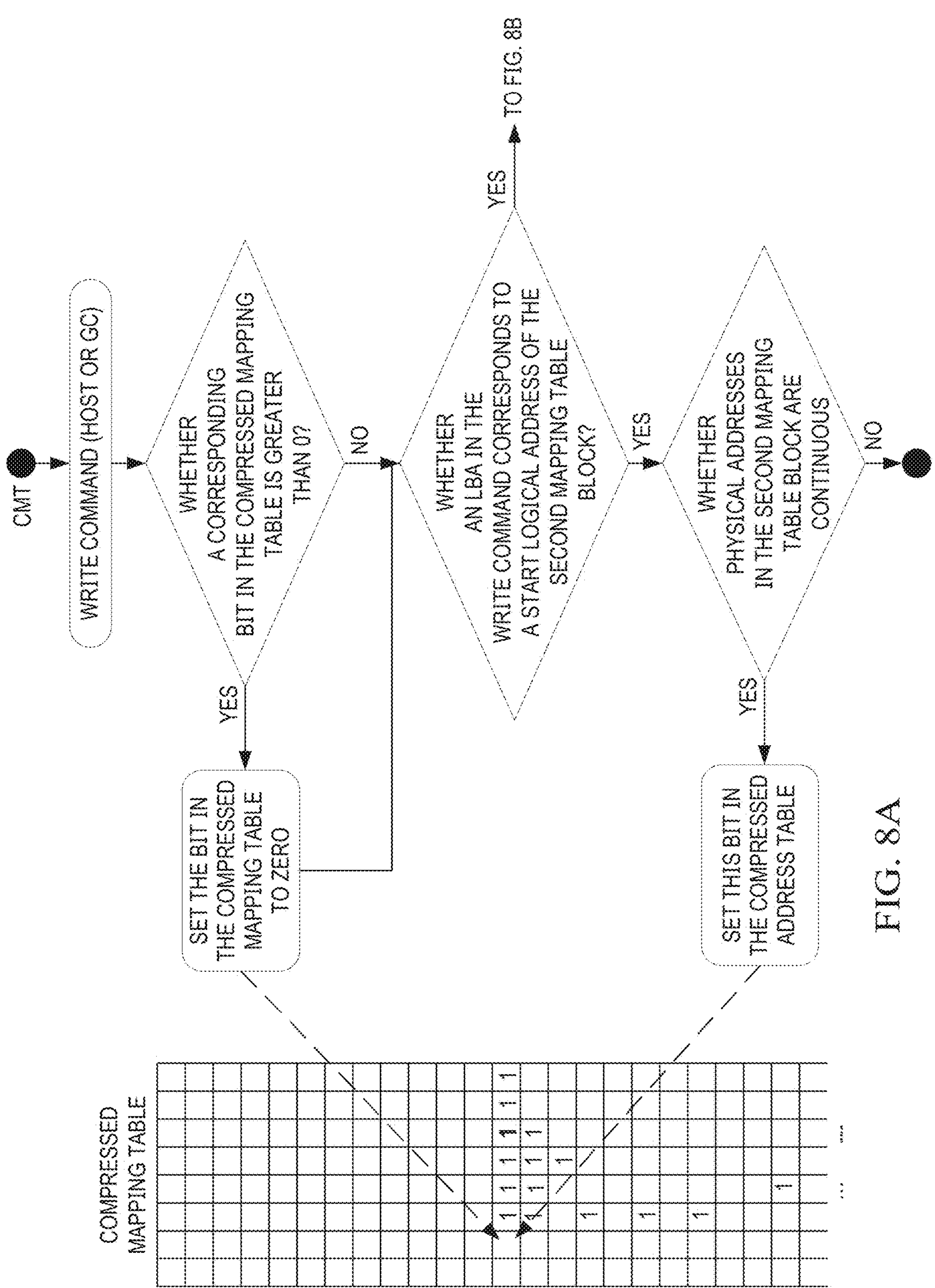
FIGS. 8A and 8B (collectively referred to herein as FIG. 8) illustrates a schematic diagram of an update flow of the compressed mapping table according to some examples.
Figure 8B:
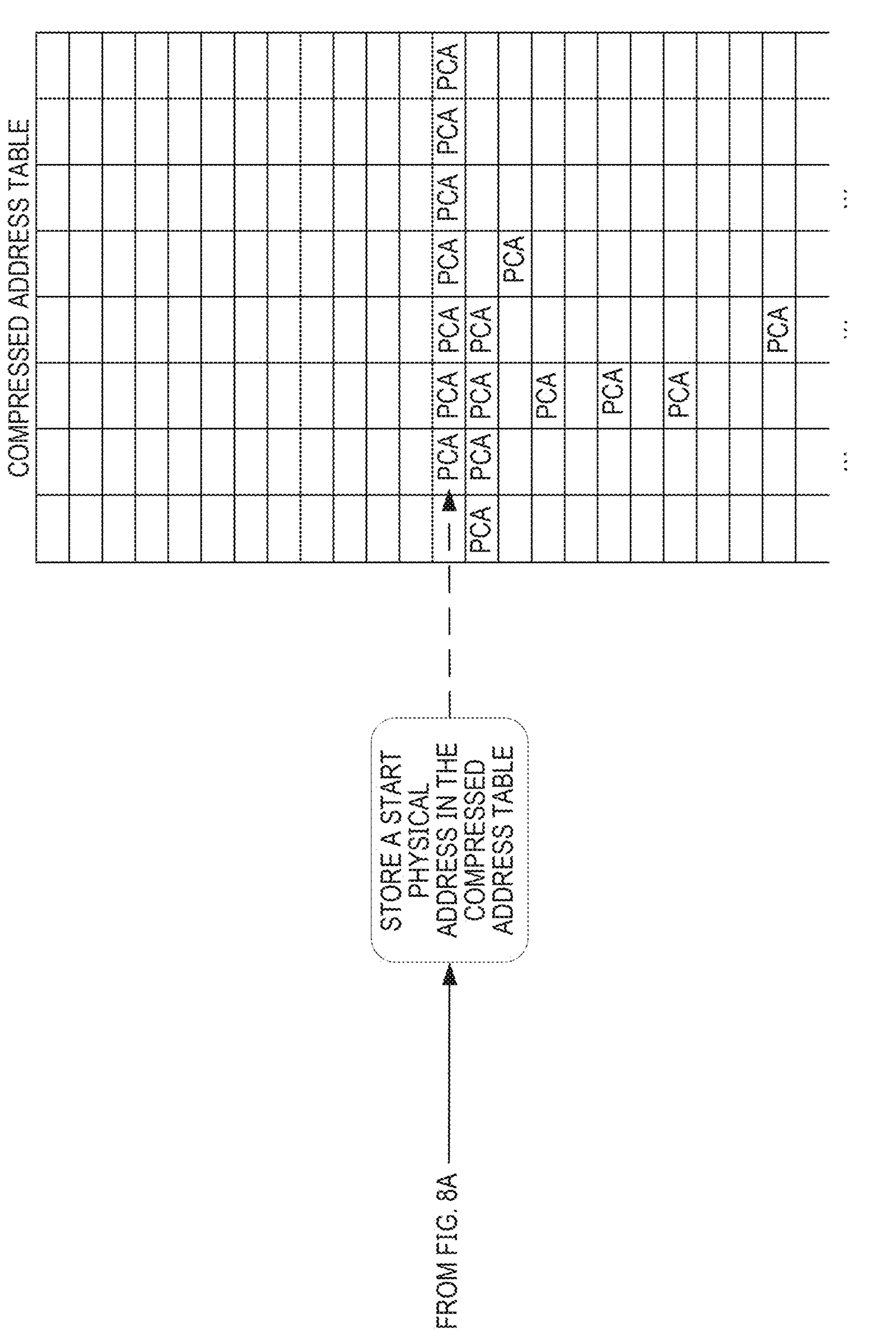

As shown in FIG. 8, in response to the LBA in the write command corresponding to the start logical address of the second mapping table block, the memory controller acquires the physical address corresponding to the LBA in this second mapping table block, e.g., determining the table entry in the L2P mapping table corresponding to the LCA and acquiring the PCA in the table entry as the physical address corresponding to the LBA. Alternatively, when executing the write command, the memory controller caches the physical address allocated to the LBA in the memory of the memory controller, and the memory controller may acquire the physical address allocated to the LBA from the memory.

In response to the LBA in the write command corresponding to the start logical address of the second mapping table block, the physical address corresponding to the LBA is a start physical address of the second mapping table block, and the memory controller may store the start physical address in a table entry in the compressed address table. In some examples, when the compressed address table comprises the first compressed address table and the second compressed address table, the start physical address is stored in a table entry in the first compressed address table corresponding to the second mapping table block. In response to the LBA in the write command not corresponding to the start logical address of the second mapping table block, the operation of storing the start physical address in a table entry in the compressed address table corresponding to the second mapping table block is not performed.

In response to the LBA in the write command corresponding to the start logical address of the second mapping table block, the memory controller performs the continuity detection on the physical addresses in the second mapping table block.

In some examples, the memory controller obtains the detection result by detecting whether a plurality of LBAs corresponding to the second mapping table block are performed continuously, e.g., by a detection process shown in operation 7011 to operation 7012 below.

At operation 7011, The memory controller detects whether a plurality of write operations corresponding to a plurality of target logical addresses are performed continuously, the plurality of target logical addresses corresponding to the second mapping table block.

The plurality of target logical addresses are various logical addresses corresponding to the second mapping table block.

In response to the LBA in the write command currently finished execution corresponding to the start logical address of the second mapping table block, using the start logical address of the second mapping table block as a current logical address, the memory controller continues to acquire a new write command, performs a write operation on the memory device based on the new write command, e.g., allocating a physical address (e.g., PCA) to an LBA in the new write command, and performs the write operation on the memory device based on the physical address, so as to write to-be-written data in the new write command to the physical address. In the L2P mapping, a mapping table block to which the LBA belongs records a mapping relationship between the LBA and the physical address. Regarding the new write command, a logical address (e.g., LCA) corresponding to the LBA in the new write command is used as a new logical address. Judging whether the new logical address is a next target logical address following the current logical address in the plurality of target logical addresses is performed; and if no, it indicates that the plurality of write operations corresponding to the plurality of target logical addresses are performed discontinuously, in which case the continuity detection on the second mapping table block is ended. If the new logical address is the next target logical address following the current logical address in the plurality of target logical addresses, it indicates that write operations corresponding to the current logical address and the new logical address are performed continuously, in which case the new logical address is used as the current logical address, then acquisition of a new write command is continued, a logical address (e.g., LCA) corresponding to an LBA in the new write command is used as a new logical address, the above operation of judging whether the new logical address is a next target logical address following the current logical address in the plurality of target logical addresses is performed again, and so on, until the acquired new logical address is a last logical address in the plurality of target logical addresses. As such, the plurality of write operations corresponding to the plurality of target logical addresses are performed continuously, in which case the continuity detection on the second mapping table block is ended.

That a new logical address is not a next target logical address following the current logical address in the plurality of target logical addresses may present as follows: the new logical address is less than or equal to the current logical address, in which case the new logical address may be any of target logical addresses prior to the next target logical address, or may be a logical address (e.g., LCA) corresponding to a mapping table block with a number less than that of the second mapping table block. Alternatively, that a new logical address is not a next target logical address following the current logical address in the plurality of target logical addresses may also present as follows: the new logical address is greater than the next target logical address, in which case the new logical address may be any of target logical addresses following the next target logical address, or may be a logical address (e.g., LCA) corresponding to a mapping table block with a numbering greater than that of the second mapping table block.

At operation 7012, the memory controller obtains a first detection result in response to the plurality of write operations corresponding to the plurality of target logical addresses being performed continuously, and obtains a second detection result in response to the plurality of write operations being not performed continuously, wherein the first detection result is to indicate that the physical addresses in the second mapping table block are continuous, and the second detection result is to indicate that the physical addresses in the second mapping table block are discontinuous.

In some other examples, the memory controller acquires the detection result by querying the physical addresses in the second mapping table block. In an example, the plurality of physical addresses in the second mapping table block are acquired from the L2P mapping table, e.g., acquiring a memory address of the second mapping table block from the second compressed address table, and based on the memory address, acquiring the plurality of physical addresses in the second mapping table block from the second mapping table block stored by the memory device. The first detection result is obtained in response to the plurality of physical addresses being continuous, and the second detection result is obtained in response to the plurality of physical addresses being discontinuous.

At operation 702, the memory controller updates the second attribute identifier corresponding to the second mapping table block in the compressed mapping table based on the detection result.

In the case of acquiring the detection result by detecting whether the write operations corresponding to the plurality of target logical addresses are performed continuously, the second attribute identifier in the compressed mapping table indicates that the physical addresses in the second mapping table block are continuous at this time, and the start physical address of the second mapping table block is stored in the table entry in the compressed address table corresponding to the second mapping table block. As shown in FIG. 8, the second detection result is obtained if the physical addresses in the second mapping table block are discontinuous, without the need to update information of the second mapping table block in the compressed mapping table and the compressed address table, and at this time, one time of maintenance for the information of the second mapping table block in the compressed mapping table and the compressed address table is completed. As shown in FIG. 8, the second detection result is obtained if the physical addresses in the second mapping table block are continuous, and the memory controller updates the second attribute identifier corresponding to the second mapping table block in the compressed mapping table based on the second detection result. In an example, the second attribute identifier in the compressed mapping table is set to indicate that the physical addresses in the second mapping table block are continuous, e.g., setting the bit in the compressed mapping table corresponding to the second mapping table block to 1, so that the second attribute identifier is equal to 1. If there is one compressed address table, the memory controller further updates the start physical address of the second mapping table block in the compressed address table to be the memory address of the second mapping table block based on the second detection result; if the compressed address table comprises the first compressed address table and the second compressed address table, the memory controller further stores, in the table entry in the second compressed address table corresponding to the second mapping table block, the memory address of the second mapping table block based on the second detection result, so as to complete one time of maintenance for the information of the second mapping table block in the compressed mapping table and the compressed address table. When a write command corresponding to the start logical address of the second compressed mapping table block is acquired again subsequently, above operations 7011, 7012, and 702 are performed again to perform another time of maintenance for the information of the second mapping table block in the compressed mapping table and the compressed address table.

In the case of acquiring the detection result by querying the physical addresses in the second mapping table block, each attribute identifier in the compressed mapping table indicates initially that physical addresses in a corresponding mapping table block are discontinuous, and in response to the detection result of the second mapping table block being the first detection result, the memory controller updates the second attribute identifier in the compressed mapping table corresponding to the second mapping table block based on the first detection result. In an example, the second attribute identifier in the compressed mapping table is set to indicate that the physical addresses in the second mapping table block are continuous, e.g., setting the second attribute identifier to 1. Based on the first detection result, the start physical address of the second mapping table block may be stored in the table entry in the compressed address table (or the first compressed address table) corresponding to the second mapping table block, to complete one time of maintenance for the information of the second mapping table block in the compressed mapping table and the compressed address table. In response to the result of the second mapping table block being the second detection result, the memory controller does not perform the operation of updating the second attribute identifier in the compressed mapping table corresponding to the second mapping table block and the operation of storing the start physical address of the second mapping table block, but rather stores, in the table entry in the compressed address table (or the second compressed address table) corresponding to the second mapping table block, the memory address of the second mapping table block based on the second detection result, to complete one time of maintenance for the information of the second mapping table block in the compressed mapping table and the compressed address table. After a certain period of time, the information of the second mapping table block in the compressed mapping table and the compressed address table is maintained once again in the manner described above, so as to implement periodic maintenance of the information of the second mapping table block in the compressed mapping table and the compressed address table.

The above description is introduced with an example where the information of the second mapping table block in the compressed mapping table and the compressed address table is maintained. In a similar manner, the memory controller may maintain information of each mapping table block in the L2P mapping table, in the compressed mapping table and the compressed address table, which is no longer repeated here.

Figure 7:
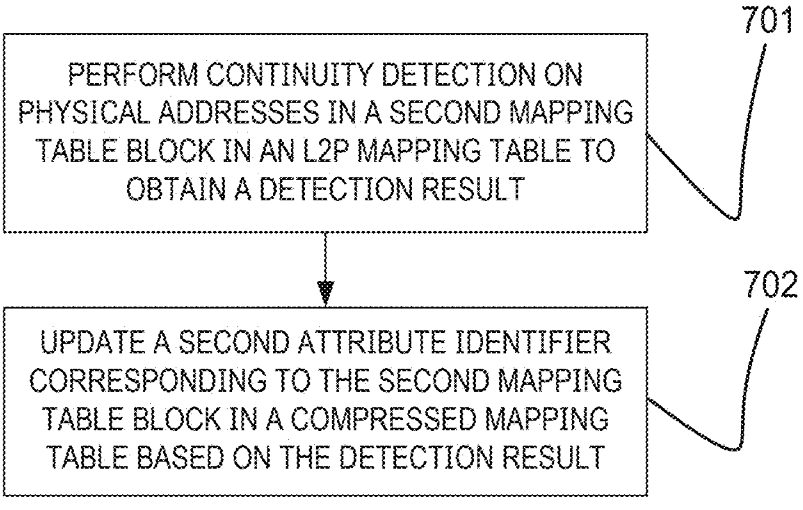
FIG. 7 illustrates a flow diagram of a method of operating a memory system according to some examples.

In the example shown in FIG. 7, the continuity detection is performed on the physical addresses in the mapping table block in the L2P mapping table, to accurately determine whether the physical addresses in the mapping table block are continuous, and then the attribute identifier in the compressed mapping table corresponding to the mapping table block is updated based on the detection result, so that the attribute identifier in the compressed mapping table can accurately indicate whether the physical addresses in the mapping table block in the L2P mapping table are continuous. Furthermore, as each mapping table block in the compressed mapping table corresponds to one bit and one physical address related to each mapping table block is stored in the compressed address table, the amount of information of the mapping table block recorded in the compressed mapping table and the compressed address table is relatively small, so that the compress mapping and the compressed address table can be updated rapidly, thereby improving an updating speed of the compress mapping and the compressed address table.

Figure 9:
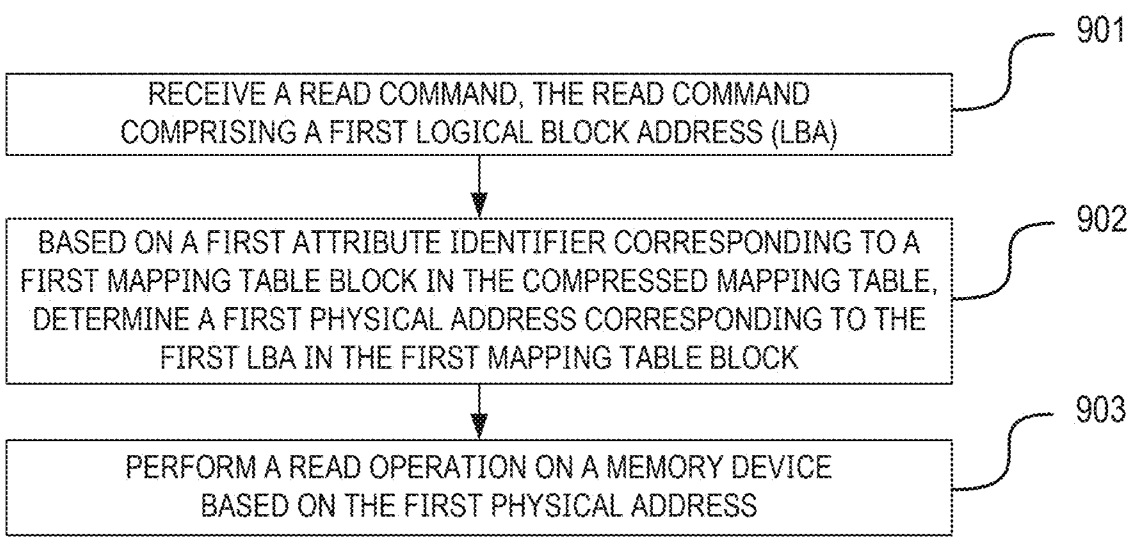
FIG. 9 illustrates a flow diagram of another method of operating a memory system according to some examples.

Next, a process of using the compressed mapping table involved above is described through a flow of the method of operating the memory system shown in FIG. 9, wherein the method is performed by the memory controller in the memory system, and comprises the following operations.

At operation 901, the memory controller receives a read command, the read command comprising a first logical block address (LBA).

Figure 10A:
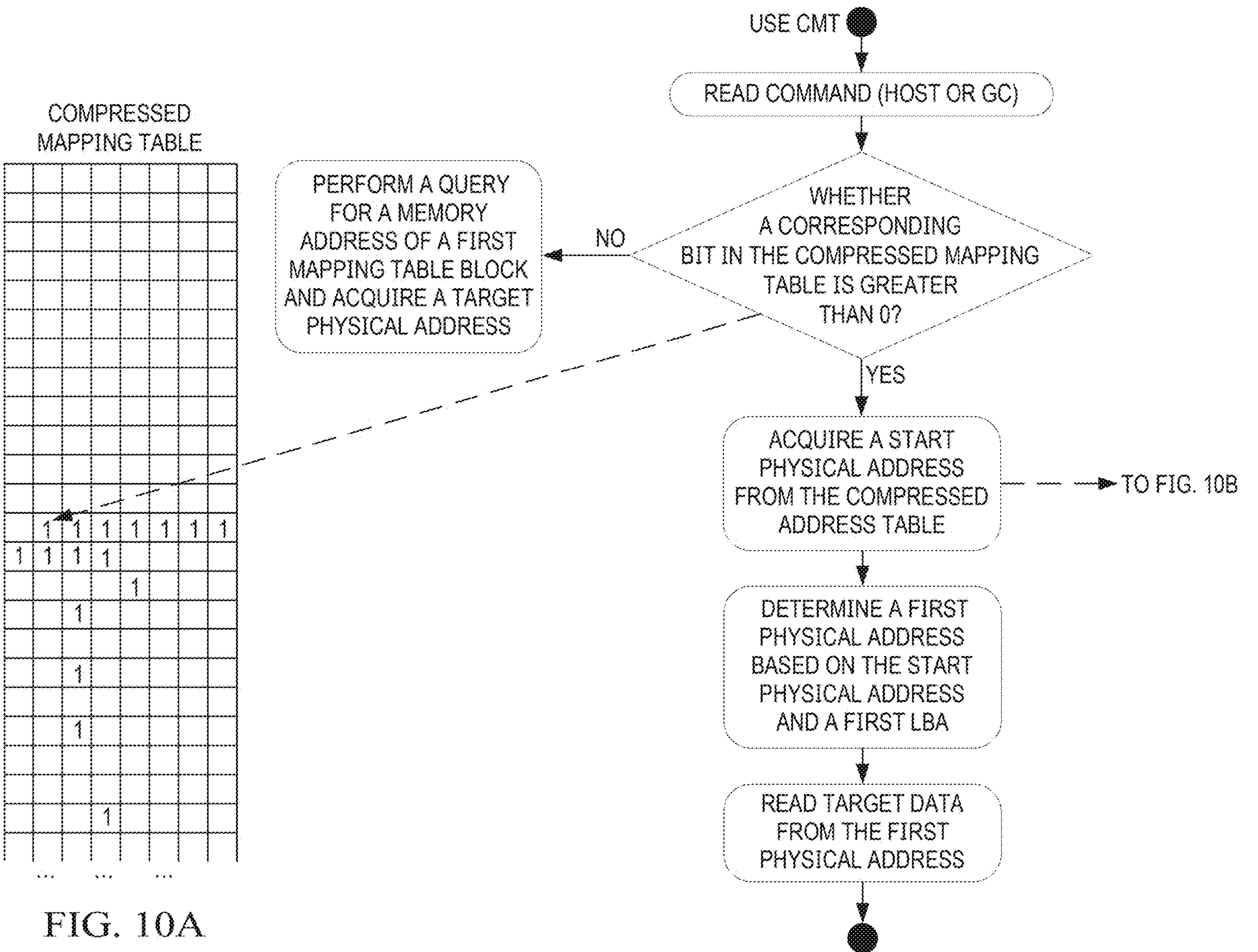
FIGS. 10A and 10B (collectively referred to herein as FIG. 10) illustrates a schematic diagram of a use flow of the compressed mapping table according to some examples.
Figure 10B:
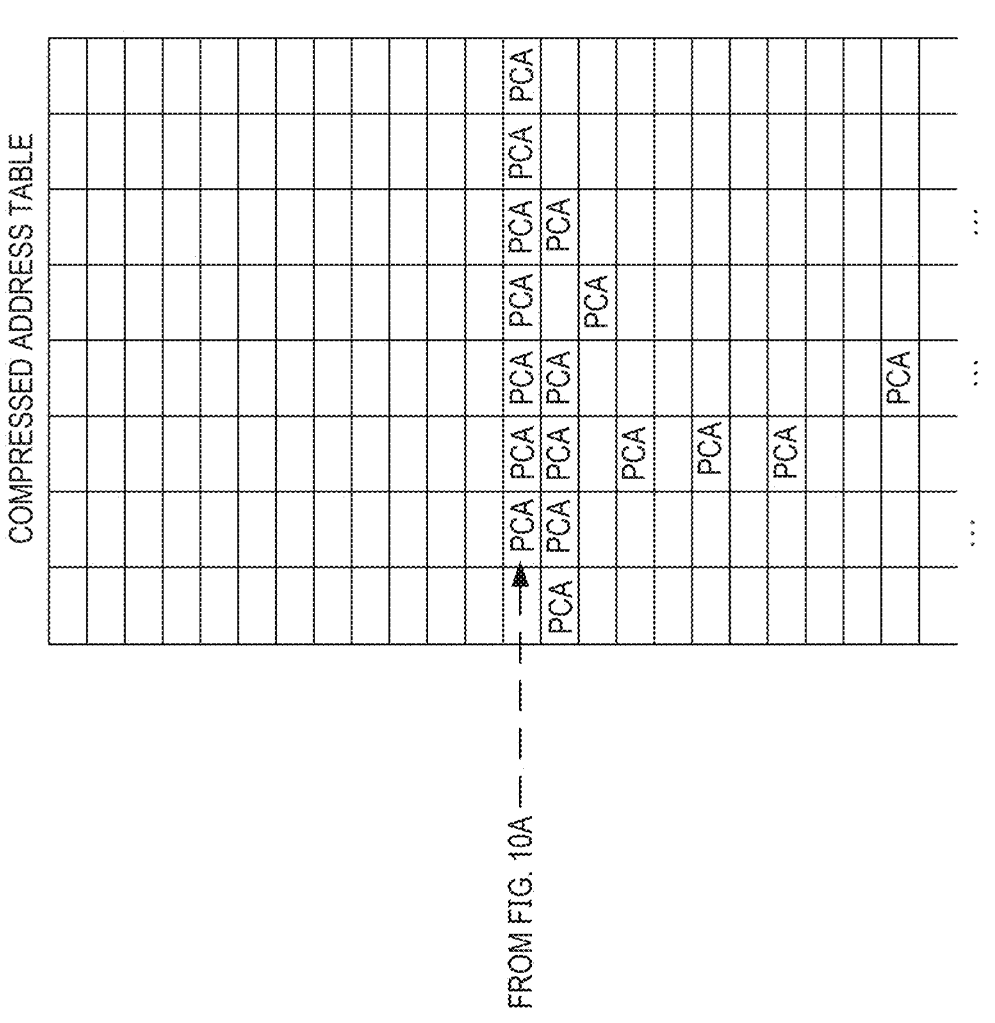

The first LBA refers to a to-be-read LBA to which the read command relates, and the read command instructs reading of user data at a physical address corresponding to the first LBA. As shown in FIG. 10, the read command may be any read command sent by the host, or any read command triggered in the garbage collection (GC) process to read the valid data in the garbage collection process.

At operation 902, based on a first attribute identifier corresponding to a first mapping table block in the compressed mapping table, the memory controller determines a first physical address corresponding to the first LBA in the first mapping table block.

The compressed mapping table is the compressed mapping table (e.g., the compressed mapping table involved in FIG. 7 above) described above, the first mapping table block is a mapping table block corresponding to the first LBA in the L2P mapping table, and the first physical address is a physical address in the first mapping table block corresponding to the first LBA.

The memory controller determines the LBA in the read command to be the first LBA, combines an LUN in the read command with the first LBA to form an LCA corresponding to the first LBA, determines a mapping table block in the L2P mapping table corresponding to the LCA to be the first mapping table block, performs a query in the compressed mapping table for the attribute identifier corresponding to the first mapping table block, and determines the attribute identifier obtained by the query to be the first attribute identifier.

The first attribute identifier may indicate that the physical addresses in the corresponding mapping table block are continuous, or may indicate that the physical addresses in the corresponding mapping table block are discontinuous. When the first attribute identifier indicates that the physical addresses in the corresponding mapping table block are continuous, a process of determining the first physical address may be as follows:

The memory controller determines a start physical address in the first mapping table block in response to the first attribute identifier indicating that physical addresses in the corresponding mapping table block are continuous. In an example, the start physical address is acquired from the compressed address table. Taking FIG. 10 as an example, determining whether a bit (e.g., the first attribute identifier) in the compressed mapping table corresponding to the first mapping table block is greater than 0 is performed. In response to the bit being greater than 0 (e.g., the bit being 1), which indicates that the physical addresses in the first mapping table block are continuous, the memory controller queries a table entry in the compressed address table corresponding to the first mapping table block, and acquires a physical address (e.g., PCA) in the table entry as the start physical address in the first mapping table block. Necessarily, if the compressed address table comprises the first compressed address table, the start physical address is acquired from the first compressed address table. After acquiring the start physical address, the memory controller determines the first physical address based on the start physical address and the first LBA. For example, the first physical address is determined based on an offset between the LCA corresponding to the first LBA and the start logical address as well as the start physical address, for example, according to the following formula (1).

$$\text{First physical address} = \text{start physical address} + (\text{LCA} - \text{start logical address}) * C \quad (1)$$

C is an offset coefficient between physical addresses and corresponding logical addresses, which may be set according to an actual scenario, for example, C=1 or C is not equal to 1, as long as not equal to 0. Here, the examples of the present application do not limit the value of C. (LCA—start logical address) is an offset between the LCA and the start logical address.

When the first attribute identifier indicates that the physical addresses in the corresponding mapping table block are discontinuous, the process of determining the first physical address may be as follows: the memory controller acquires the first physical address from the first mapping table block in response to the first attribute identifier indicating that the physical addresses in the corresponding mapping table block are discontinuous. In an example, a memory address of first mapping table block is acquired from the compressed address table. For example, the table entry in the compressed address table corresponding to the first mapping table block is queried, and the physical address in the table entry is acquired as the memory address of the first mapping table block. Necessarily, if the compressed address table comprises the second compressed address table, the memory address of first mapping table block may be acquired from the second compressed address table. After the memory address of first mapping table block is acquired, based on the memory address of first mapping table block, the first physical address is acquired from the first mapping table block stored in the memory device. For example, a read operation is performed on the memory device based on the memory address of the first mapping table block, the memory device returns, to the memory controller, various physical address in the first mapping table block in response to the read operation, and the memory controller determines the physical address corresponding to the LCA corresponding to the first LBA among returned physical addresses to be the first physical address. Still taking FIG. 10 as an example, the bit (e.g., the first attribute identifier) in the compressed mapping table corresponding to the first mapping table block is not greater than 0, e.g., the bit is 0, it indicates that the physical addresses in the first mapping table block are discontinuous, in which case the memory controller performs a query in the compressed address table for the memory address of the first mapping table block, and acquires the first physical address (e.g., target physical address) from the memory address.

After the first physical address is acquired, target data is read from the first physical address of the memory device, in a process as shown in operation 903 below.

At operation 903, the memory controller performs a read operation on the memory device based on the first physical address, so as to read data (e.g., target data) stored in the first physical address of the memory device.

The memory device returns the target data stored in the first physical address to the memory controller in response to the read operation, so that the memory controller obtains the target data. If the read command is from the host, the memory controller returns the target data to the host; if the read command is the read command triggered in the garbage collection process, the memory controller generates a write command based on the target data, executes the write command, and writes the target data to another physical address of the memory device.

In the example shown in FIG. 9, the to-be-read physical address involved in the read command may be determined through the attribute identifier in the compressed mapping table, and then the data is read from the physical address, reducing a count of queries in the L2P mapping table during the data read process, without the need to load the L2P mapping table to the memory of the memory controller frequently, reducing the memory space occupied by the L2P mapping table, and thereby improving the random read and write performance of the memory system, the utilization of the memory of the memory controller, and the performance of the firmware. In addition, the amount of information of the mapping table blocks that is recorded in the compress mapping and compressed address tables is relatively small, thus making data reading using the compressed mapping table and the compressed address table faster and easier.

The method of operating the memory system provided by the present application is described above with an example where the L2P mapping table comprises the LCA-to-PCA mapping relationship. In some other examples, in the single-level mapping solution or the multi-level mapping solution, the LCA in the L2P mapping table can be replaced with the LBA, in which case the logical address in the L2P mapping table corresponding to the LBA in the read/write command is the LBA itself; and/or the PCA in the L2P mapping table can also be replaced with a physical block address (PBA), in which case the physical address in the L2P mapping table corresponding to the LBA in the read/write command is the PBA. Such the L2P mapping table is also applicable to the method of operating the memory system provided by the present application, and is no longer repeated here.

The above descriptions are only alternative examples of the present application, and are not used to limit the present application. Any modifications, equivalent replacements and improvements etc. made within the spirit and principle of the present application shall be included within the scope of protection of the present application.

What is claimed is:

1. A method of operating a memory system, comprising:

receiving a read command, the read command comprising a first logical block address (LBA);

based on a first attribute identifier corresponding to a first mapping table block in a compressed mapping table, determining a first physical address corresponding to the first LBA in the first mapping table block, wherein the first mapping table block is of multiple mapping table blocks of a logical-to-physical (L2P) mapping table and corresponds to a first logical memory space that comprises a plurality of local memory addresses that respectively correspond to a plurality of physical addresses, wherein the compressed mapping table comprises a plurality of attribute identifiers each uniquely corresponding to a respective one of the mapping table blocks, the plurality of attribute identifiers including the first attribute identifier and each indicating whether all physical address of a respective one of the mapping table blocks are continuous; and performing a read operation on a memory device based on the first physical address.

2. The method of claim 1, wherein the attribute identifier occupies 1 bit.

3. The method of claim 1, wherein based on a first attribute identifier corresponding to a first mapping table block in the compressed mapping table, determining a first physical address corresponding to the first LBA in the first mapping table block comprises:

determining a start physical address in the first mapping table block in response to the first attribute identifier indicating that physical addresses in the corresponding mapping table block are continuous; and determining the first physical address based on the start physical address and the first LBA.

4. The method of claim 3, wherein the determining a start physical address in the first mapping table block comprises:

acquiring the start physical address from a compressed address table, wherein the compressed address table is to store a start physical address in each mapping table block of the L2P mapping table.

5. The method of claim 1, wherein based on a first attribute identifier corresponding to a first mapping table block in the compressed mapping table, determining a first physical address corresponding to the first LBA in the first mapping table block comprises:

acquiring the first physical address from the first mapping table block in response to the first attribute identifier indicating that the physical addresses in the corresponding mapping table block are discontinuous.

6. The method of claim 1, further comprising:

performing continuity detection on physical addresses in a second mapping table block to obtain a detection result, the detection result indicating whether the physical addresses in the second mapping table block are continuous, and the second mapping table block being any mapping table block in the L2P mapping table; and updating a second attribute identifier corresponding to the second mapping table block in the compressed mapping table based on the detection result.

7. A method of operating a memory system, comprising:

performing continuity detection on physical addresses in a second mapping table block in a logical-to-physical (L2P) mapping table to obtain a detection result, the detection result indicating whether the physical addresses in the second mapping table block are continuous; and updating a second attribute identifier corresponding to the second mapping table block in a compressed mapping table based on the detection result, wherein the compressed mapping table comprising a plurality of attribute identifiers each uniquely corresponding to a respective one of mapping table blocks, including the second mapping table block, of the L2P mapping table, wherein each mapping table block corresponds to a first logical memory space that comprises a plurality of local memory addresses that respectively correspond to a plurality of physical addresses, wherein the plurality of attribute identifiers include the second attribute identifier and each indicate whether all physical address of a respective one of the mapping table blocks are continuous.

8. The method of claim 7, wherein the attribute identifier occupies 1 bit.

9. The method of claim 7, wherein performing the continuity detection on the physical addresses in the second mapping table block in the L2P mapping table to obtain the detection result comprises:

detecting whether a plurality of write operations corresponding to a plurality of target logical addresses are performed continuously, the plurality of target logical addresses corresponding to the second mapping table block;

obtaining a first detection result in response to the plurality of write operations being performed continuously, the first detection result indicating that the physical addresses in the second mapping table block are continuous; and obtaining a second detection result in response to the plurality of write operations being not performed continuously, the second detection result indicating that the physical addresses in the second mapping table block are discontinuous.

10. The method of claim 7, wherein performing the continuity detection on the physical addresses in the second mapping table block in the L2P mapping table to obtain the detection result comprises:
acquiring a plurality of physical addresses in the second mapping table block from the L2P mapping table;
obtaining a first detection result in response to the plurality of physical addresses being continuous, the first detection result indicating that the physical addresses in the first mapping table block are continuous; and
obtaining a second detection result in response to the plurality of physical addresses being discontinuous, the second detection result indicating that the physical addresses in the first mapping table block are discontinuous.

11. The method of claim 7, further comprising:
receiving a read command, the read command comprising a first logical block address (LBA);
based on a first attribute identifier corresponding to a first mapping table block in the compressed mapping table, determining a first physical address corresponding to the first LBA in the first mapping table block, the first mapping table block being the mapping table block to which the first LBA belongs; and
performing a read operation on a memory device based on the first physical address.

12. The method of claim 11, wherein based on the first attribute identifier corresponding to the first mapping table block in the compressed mapping table, determining the first physical address corresponding to the first LBA in the first mapping table block comprises:
determining a start physical address in the first mapping table block in response to the first attribute identifier indicating that physical addresses in the corresponding mapping table block are continuous; and
determining the first physical address based on the start physical address and the first LBA.

13. A memory system, comprising:
a memory controller configured to:
receive a read command, the read command comprising a first logical block address (LBA);
based on a first attribute identifier corresponding to a first mapping table block in a compressed mapping table, determine a first physical address corresponding to the first LBA in the first mapping table block,
wherein the first mapping table block is of multiple mapping table blocks of a logical-to-physical (L2P) mapping table and corresponds to a first logical memory space that comprises a plurality of local memory addresses that respectively correspond to a plurality of physical addresses,
wherein the compressed mapping table comprises a plurality of attribute identifiers each uniquely corresponding to a respective one of the mapping table blocks, the plurality of attribute identifiers including the first attribute identifier and each indicating whether all physical address of a respective one of the mapping table blocks are continuous; and
perform a read operation on a memory device based on the first physical address, and
the memory device configured to:
return data stored at the first physical address to the memory controller in response to the read operation.

14. The memory system of claim 13, wherein the attribute identifier occupies 1 bit.

15. The memory system of claim 13, wherein the memory controller is further configured to:
determine a start physical address in the first mapping table block in response to the first attribute identifier indicating that physical addresses in the corresponding mapping table block are continuous; and
determine the first physical address based on the start physical address and the first LBA.

16. The memory system of claim 15, wherein the memory controller is further configured to:
acquire the start physical address from a compressed address table, wherein the compressed address table is to store a start physical address in each mapping table block of the L2P mapping table.

17. The memory system of claim 13, wherein the memory controller is further configured to:
acquire the first physical address from the first mapping table block in response to the first attribute identifier indicating that the physical addresses in the corresponding mapping table block are discontinuous.

18. The memory system of claim 13, wherein the memory controller is further configured to:
perform continuity detection on physical addresses in a second mapping table block to obtain a detection result, the detection result indicating whether the physical addresses in the second mapping table block are continuous, and the second mapping table block being any mapping table block in the L2P mapping table; and
update a second attribute identifier corresponding to the second mapping table block in the compressed mapping table based on the detection result.

19. The memory system of claim 18, wherein the memory controller is further configured to:
detect whether a plurality of write operations corresponding to a plurality of target logical addresses are performed continuously, the plurality of target logical addresses corresponding to the second mapping table block;
obtain a first detection result in response to the plurality of write operations being performed continuously, the first detection result indicating that the physical addresses in the second mapping table block are continuous; and
obtain a second detection result in response to the plurality of write operations being not performed continuously, the second detection result indicating that the physical addresses in the second mapping table block are discontinuous.

20. The memory system of claim 18, wherein the memory controller is further configured to:
acquire a plurality of physical addresses in the second mapping table block from the L2P mapping table;
obtain a first detection result in response to the plurality of physical addresses being continuous, the first detection result indicating that the physical addresses in the first mapping table block are continuous; and
obtain a second detection result in response to the plurality of physical addresses being discontinuous, the second detection result indicating that the physical addresses in the first mapping table block are discontinuous.

* * * * *